(12) United States Patent
Takano et al.

(10) Patent No.: US 8,492,301 B2
(45) Date of Patent: *Jul. 23, 2013

(54) DIELECTRIC CERAMIC COMPOSITION AND CERAMIC ELECTRONIC COMPONENT

(75) Inventors: Kosuke Takano, Tokyo (JP); Tomohisa Fukuoka, Tokyo (JP); Makoto Maeda, Tokyo (JP); Yuhta Matsunaga, Tokyo (JP); Masahide Ishizuya, Tokyo (JP); Tamotsu Ishiyama, Tokyo (JP); Takahiro Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 247 days.

This patent is subject to a terminal disclaimer.

(21) Appl. No.: 13/037,739

(22) Filed: Mar. 1, 2011

(65) Prior Publication Data
US 2011/0216473 A1 Sep. 8, 2011

(30) Foreign Application Priority Data

Mar. 5, 2010 (JP) .................................. 2010-049498
Jan. 19, 2011 (JP) .................................. 2011-008689

(51) Int. Cl.
*C04B 35/468* (2006.01)
*H01G 4/12* (2006.01)

(52) U.S. Cl.
USPC ...................... 501/139; 501/138; 361/321.4

(58) Field of Classification Search
USPC ................................. 501/138, 139; 361/321.4
See application file for complete search history.

(56) References Cited

U.S. PATENT DOCUMENTS

| 5,995,360 A | 11/1999 | Hata et al. |
| 6,226,172 B1 | 5/2001 | Sato et al. |
| 6,243,254 B1 | 6/2001 | Wada et al. |
| 6,245,433 B1 | 6/2001 | Nakamura et al. |

(Continued)

FOREIGN PATENT DOCUMENTS

| CN | 1889210 A | 1/2007 |
| CN | 101549997 A | 10/2009 |

(Continued)

OTHER PUBLICATIONS

Aug. 15, 2012 Chinese Office Action issued in Chinese Application No. 201110059754.0.

(Continued)

*Primary Examiner* — Karl Group
(74) *Attorney, Agent, or Firm* — Oliff & Berridge, PLC.

(57) ABSTRACT

A dielectric ceramic composition includes a compound having perovskite type crystal structure shown by a general formula $ABO_3$, where A is at least one selected from Ba, Ca and Sr, and B is at least one selected from Ti and Zr, as a main component. The dielectric ceramic composition includes, as subcomponents, with respect to 100 moles of the compound, 1.0 to 2.5 moles of an oxide of RA (Dy, Gd and Tb); 0.2 to 1.0 mole of an oxide of RB (Ho and Y); 0.1 to 1.0 mole of an oxide of RC (Yb and Lu); 0.8 to 2.0 moles of Mg oxide and 1.2 to 3.0 moles of an oxide including Si in terms of $RA_2O_3$, $RB_2O_3$, $RC_2O_3$, Mg and Si, respectively. Also, when contents of the oxide of RA, RB and RC with respect to 100 moles of the compound are defined as "α", "β" and "γ", respectively, the "α", "β" and "γ" satisfy relations of $2.5 \leq (\alpha/\beta) \leq 5.0$ and $1.0 \leq (\beta/\gamma) \leq 10.0$. According to the present invention, a dielectric ceramic composition having good properties can be provided.

10 Claims, 1 Drawing Sheet

U.S. PATENT DOCUMENTS

| | | |
|---|---|---|
| 6,559,084 B1 | 5/2003 | Fujikawa et al. |
| 6,777,363 B2 * | 8/2004 | Park et al. .................... 501/139 |
| 6,809,052 B2 | 10/2004 | Horie et al. |
| 6,917,513 B1 | 7/2005 | Kim et al. |
| 7,439,203 B2 | 10/2008 | Ito et al. |
| 7,580,242 B2 | 8/2009 | Aman et al. |
| 7,718,560 B2 * | 5/2010 | Yanagida et al. ............. 501/139 |
| 7,759,269 B2 * | 7/2010 | Takahashi et al. ............ 501/138 |
| 7,790,645 B2 | 9/2010 | Seki et al. |
| 2005/0286207 A1 | 12/2005 | Ito et al. |
| 2007/0191211 A1 | 8/2007 | Hosono et al. |
| 2009/0246508 A1 | 10/2009 | Takano et al. |
| 2011/0286146 A1 * | 11/2011 | Sato et al. .................. 361/321.5 |

FOREIGN PATENT DOCUMENTS

| | | |
|---|---|---|
| JP | A-10-223471 | 8/1998 |
| JP | A-2000-154057 | 6/2000 |
| JP | A-2001-031467 | 2/2001 |
| JP | A-2003-277139 | 10/2003 |
| JP | A-2007-217205 | 8/2007 |
| JP | A-2011-155123 | 8/2011 |

OTHER PUBLICATIONS

Oct. 26, 2012 Notice of Allowance issued in U.S. Appl. No. 13/109,379.

Jan. 24, 2013 Office Action issued in U.S. Appl. No. 13/137,703.

* cited by examiner

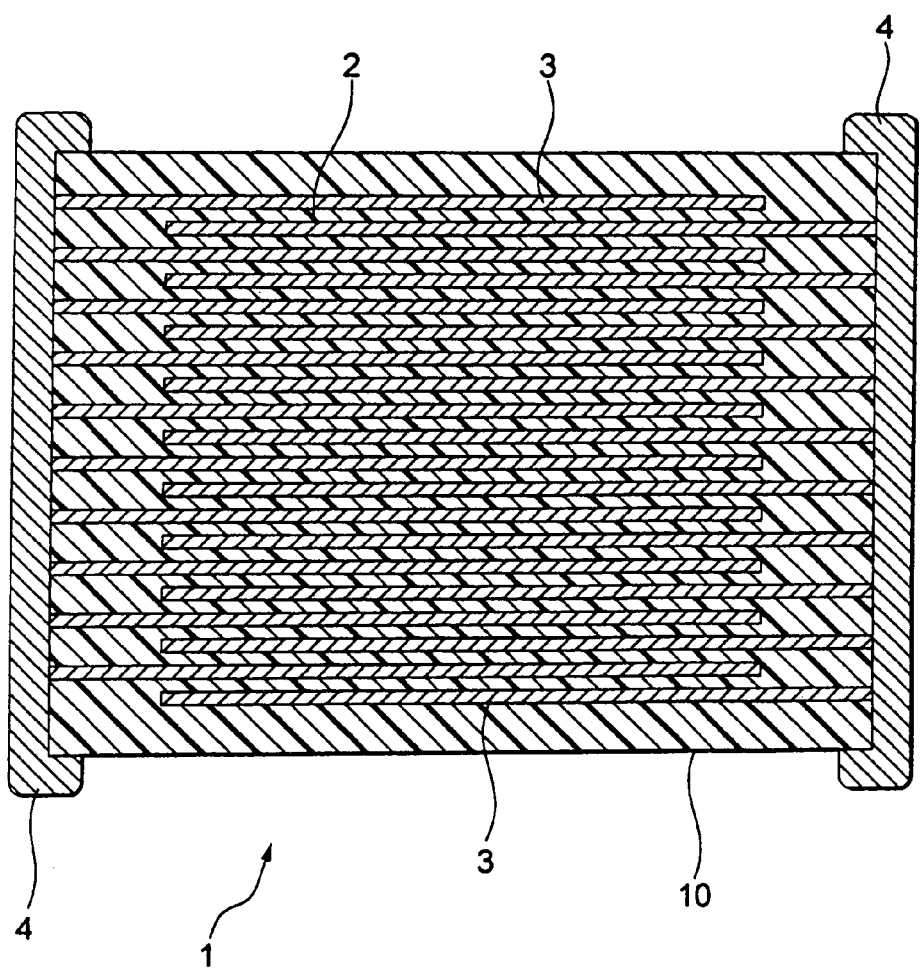

DIELECTRIC CERAMIC COMPOSITION AND CERAMIC ELECTRONIC COMPONENT

BACKGROUND OF THE INVENTION

Field of the Invention

The present invention relates to a dielectric ceramic composition and a ceramic electronic component in which said dielectric ceramic composition is applied to a dielectric layer, particularly, a dielectric ceramic composition and a ceramic electronic component having good characteristics, even when the dielectric layer is made thinner.

A multilayer ceramic capacitor which is one example of ceramic electronic components is widely used as electronic component having compact size, high efficiency and high reliability, and the number used in electric and electronic apparatuses is large. In recent years, along with downsizing such apparatuses and improving performance thereof, demands for further compact size, high performance and high reliability to a multilayer ceramic capacitor become more growing.

In order to respond to such demands, for example, Japanese Patent Publication No. H10-223471 describes a multilayer ceramic capacitor having a dielectric ceramic layer in which barium titanate includes two kinds of rare earth oxides and other metal oxides. Japanese Patent Publication No. H10-223471 also describes this multilayer ceramic capacitor shows good specific permittivity, insulation resistance, temperature characteristic and climate proof performance such as high temperature load lifetime and the like.

However, a thickness of the dielectric layer of the multilayer ceramic capacitor described in examples of the Japanese Patent Publication No. H10-223471 is 8 μm, thus there is a problem that improvement of properties cannot be attained when the dielectric layer is made thinner.

BRIEF SUMMARY OF THE INVENTION

The present invention has been made by considering such situation, and a purpose of the invention is to provide a dielectric ceramic composition having good characteristics, and a ceramic electronic component in which the dielectric ceramic composition is applied to a dielectric layer.

In order to achieve the above mentioned purposes, a dielectric ceramic composition according to the present invention includes a compound having perovskite type crystal structure shown by a general formula $ABO_3$, where A is at least one selected from Ba, Ca and Sr, and B is at least one selected from Ti and Zr, as a main component. The dielectric ceramic composition also includes, as subcomponents, with respect to 100 moles of the compound, 1.0 to 2.5 moles of an oxide of RA in terms of $RA_3O_3$, where RA is at least one selected from Dy, Gd and Tb; 0.2 to 1.0 mole of an oxide of RB in terms of $RB_2O_3$, where RB is at least one selected from Ho and Y; 0.1 to 1.0 mole of an oxide of RC in terms of $RC_2O_3$, where RC is at least one selected from Yb and Lu; 0.8 to 2.0 moles of an oxide of Mg in terms of Mg; and 1.2 to 3.0 moles of an oxide including Si in terms of Si. Also, when contents of the oxide of RA, RB and RC with respect to 100 moles of the compound are defined as "α", "β" and "γ", respectively, the "α", "β" and "γ" satisfy relations of $2.5 \leq (\alpha/\beta) \leq 5.0$ and $1.0 \leq (\beta/\gamma) \leq 10.0$.

In the present invention, by setting content of each component within the above range, a dielectric ceramic composition having good various characteristics can be obtained even when a dielectric layer is made thinner. Particularly, by dividing rare earth elements into three groups and setting content ratios thereof within the above ranges, the degree of solute rare earth elements in the main component ($ABO_3$) can be controlled. As a result, conflicting characteristics can be compatible.

Preferably, the dielectric ceramic composition further includes, as a subcomponent, 0.03 to 0.12 mole of an oxide of at least one selected from V, Mo and W in terms of V, Mo and W.

Preferably, the dielectric ceramic composition further includes, as a subcomponent, 0.10 to 0.2 mole of an oxide of Mn and/or Cr in terms of Mn and Cr.

The dielectric ceramic composition can improve characteristics further by including the above components.

Preferably, the $ABO_3$ is $BaTiO_3$. By having this constitution, a dielectric ceramic composition having large capacity and high reliability can be obtained.

Also, a ceramic electronic component according to the present invention comprises a dielectric layer composed of any one of the above mentioned dielectric ceramic compositions and an electrode. It is preferable that a thickness of the dielectric layer is 5 μm or less. As for the ceramic electronic component, although it is not particularly limited, a multilayer ceramic capacitor, a piezo element, a chip inductor, chip varistor, a chip thermistor, a chip resistance and other surface mounted device (SMD) chip type electronic components are exemplified.

BRIEF DESCRIPTION OF THE DRAWINGS

The FIGURE is a cross sectional view of a multilayer ceramic capacitor according to one embodiment of the present invention.

DETAILED DESCRIPTION OF THE INVENTION

Below, the present invention will be explained based on embodiments shown in the drawing.
(Multilayer Capacitor 1)

As shown in FIG. 1, a multilayer ceramic capacitor 1 as one example of multilayer ceramic electronic component comprises a capacitor element body 10 in which a dielectric layer 2 and an internal electrode layer 3 are alternately stacked. The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

Although the shape of the capacitor element body 10 is not particularly limited, as shown in FIG. 1, normally, it is formed as a rectangular parallelepiped shape. Also, a dimension thereof is not particularly limited, it may be decided appropriately depending on the use.
(Dielectric Layer 2)

The dielectric layer 2 is composed of a dielectric ceramic composition according to the present embodiment. The dielectric ceramic composition according to the present embodiment includes, as a main component, a compound shown by a general formula $ABO_3$ ("A" is at least one selected from Ba, Ca and Sr, and "B" is at least one selected from Ti and Zr). Also, the dielectric ceramic composition includes dielectric particles whose main component is $ABO_3$.

As for the $ABO_3$, for example, a compound shown by $\{(Ba_{(100-x-y)}Ca_xSr_y)O\}_u(Ti_{(100-z)}Zr_z)_vO_2$ is exemplified. Note that, although any of "u", "v", "x", "y" and "z" is within an arbitrary range, it is preferable that they are within a following range.

In the above formula, the "x" is preferably $0 \leq x \leq 10$, more preferably $0 \leq x \leq 5$. The "x" shows number of Ca atoms, and a capacitance temperature coefficient and a specific permittivity can be controlled arbitrarily by setting the "x" within the above range. When the "x" is too large, the specific permittivity tends to be reduced. In the present embodiment, the Ca may not be included necessarily.

In the above formula, the "y" is preferably $0 \leq y \leq 10$, more preferably $0 \leq y \leq 5$. The "y" shows number of Sr atoms, and the specific permittivity can be improved by setting the "y" within the above range. When the "y" is too large, the temperature characteristic tends to be deteriorated. In the present embodiment, the Sr may not be included necessarily.

In the above formula, the "z" is preferably $0 \leq z \leq 30$, more preferably $0 \leq z \leq 15$. The "z" shows number of Zr atoms, and the specific permittivity can be improved by setting the "z" within the above range. When the "z" is too large, the temperature characteristic tends to be deteriorated. In the present embodiment, the Zr may not be included necessarily.

In the present embodiment, as for the $ABO_3$, barium titanate (preferably, shown by $Ba_uTi_vO_3$, where u/v is $0.995 \leq u/v \leq 1.010$) can be used preferably.

The dielectric ceramic composition according to the present embodiment includes, in addition to the above main component, an oxide of RA, an oxide of RB, an oxide of RC, an oxide of Mg and an oxide including Si, as subcomponents. "RA", "RB" and "RC" are three groups to which specific rare earth elements are divided.

When a content of the oxide of RA is defined as "α", the "α" is 1.0 to 2.5 moles, preferably 1.7 to 2.5 moles, in terms of $RA_2O_3$ with respect to 100 moles of $ABO_3$. When the "α" is too much, the specific permittivity tends to be decreased and temperature characteristic tends to be deteriorated. On the other hand, when it is too little, high temperature accelerated lifetime tends to be deteriorated. The RA is at least one selected from Dy, Gd and Tb, and is particular preferably Dy.

When a content of the oxide of RB is defined as "β", the "β" is 0.2 to 1.0 mole, preferably 0.2 to 0.6 mole, in terms of $RB_2O_3$ with respect to 100 moles of $ABO_3$. When "β" is too much, the specific permittivity tends to be decreased and high temperature accelerated lifetime tends to be deteriorated. On the other hand, when it is too little, temperature characteristic tends to be deteriorated. The RB is at least one selected from Ho and Y, and is particular preferably Ho.

When a content of the oxide of RC is defined as "γ", the "γ" is 0.1 to 1.0 mole, preferably 0.1 to 0.6 mole, in terms of $RC_2O_3$ with respect to 100 moles of $ABO_3$. When "γ" is too much, the specific permittivity tends to be decreased and high temperature accelerated lifetime tends to be deteriorated. On the other hand, when it is too little, temperature characteristic tends to be deteriorated. The RC is at least one selected from Yb and Lu, and is particular preferably Yb.

Also, it is preferable that the "α", "β" and "γ" satisfy relations of $2.5 \leq \alpha/\beta \leq 5.0$ and $1.0 \leq \beta/\gamma \leq 10.0$. More preferably, they satisfy relations of $3.0 \leq \alpha/\beta \leq 4.25$ and $1.0 \leq \beta/\gamma \leq 6.0$. When they do not satisfy the above relations, it tends to be hard to achieve a good balance between temperature characteristic and high temperature accelerated lifetime.

In the present embodiment, metal elements of the subcomponents, for example, the RA, RB and RC are solid-soluted in a dielectric particle whose main component is the $ABO_3$. Note that, the dielectric particle may have so-called core-shell structure or may have a totally solid-solution type structure.

In the present embodiment, specific rare earth elements are divided into three groups (RA, RB and RC) based on values of effective ion radius for six-fold coordination. Rare earth elements, normally, substitute A site of $ABO_3$ and are solid-soluted into $ABO_3$. When the difference between the effective ionic radius of the rare earth elements and that of the A site atom is small, the rare earth elements can substitute A site (be solid-soluted) easily. When the difference is large, the rare earth elements are hard to substitute A site (be solid-saluted).

In the present embodiment, the elements that the difference between ionic radius of A site atom and that of it is small correspond with RA, and the elements that the difference in ionic radius between A site atom and the same is large correspond with RC. The degree of solute RA into $ABO_3$ is different from that of solute RC. The RA tends to easily be solid-soluted into $ABO_3$ totally while the RC tends to be only solid-soluted into periphery of $ABO_3$ and forms core-shell structure. As a result, RA improves lifetime of the dielectric ceramic composition, however, temperature characteristic tends to be deteriorated. On the other hand, RC improves temperature characteristic of the dielectric ceramic composition, however, lifetime tends to be deteriorated.

Therefore, it would appear to achieve a good balance between temperature characteristic and lifetime by controlling the contents and ratios of RA and RC, and preventing RA from being excessively solid-soluted into $ABO_3$ with addition of RC. However, that is insufficient.

Thus, in the present embodiment, by including rare earth elements (RB) which have intermediate effective ionic radius between that of RA and that of RC, the degrees of solute three kinds of rare earth elements are controlled so as to achieve a good balance between temperature characteristic and lifetime. In addition, by setting the contents of RA, RB and RC ("α", "β" and "γ") within the above ranges, other characteristics (specific permittivity, CR product and the like) can be improved with achieving the good balance between temperature characteristic and lifetime.

A content of an oxide of Mg is 0.8 to 2.0 moles, preferably 1.3 to 2.0 moles, in terms of Mg with respect to 100 moles of $ABO_3$. When the content of the oxide of Mg is too much, high temperature accelerated lifetime tends to be deteriorated. On the other hand, when it is too little, temperature characteristic tends to be deteriorated due to too much grain growth.

A compound including Si mainly has a role of sintering aids. Also, a content of compound including Si is 1.2 to 3.0 moles, preferably 1.2 to 1.9 moles, in terms of Si with respect to 100 moles of $ABO_3$. Note that, as for the compound including Si, it may be composite oxide including Si and the like, is preferably the oxide which does not include elements substituting A site of $ABO_3$ (for example, Ca or Ba), and is more preferably $SiO_2$ alone. When the elements which substitute A site are included, a ratio of A/B in $ABO_3$ which is the main component probably changes.

It is preferable that the dielectric ceramic composition according to the present embodiment further includes, as subcomponents, an oxide of at least one selected from V, Mo and W, and an oxide of Mn and/or Cr.

A content of the oxide of at least one selected from V, Mo and W is preferably 0.03 to 0.12 mole, more preferably 0.07 to 0.12 mole, in terms of V, Mo and W with respect to 100 moles of $ABO_3$. When the content of the above oxide is too much, insulation resistance (CR product) tends to be deteriorated. On the other hand, when it is too little, high temperature accelerated lifetime tends to be deteriorated. In the present embodiment, V is preferable.

A content of the oxide of Mn and/or Cr is preferably 0.10 to 0.2 mole, more preferably 0.15 to 0.2 mole, in terms of Mn and/or Cr with respect to 100 moles of $ABO_3$. When the content of the oxide of Mn and/or Cr is too much, temperature characteristic tends to be deteriorated. On the other hand, when it is too little, insulation resistance tends to be lower. In the present embodiment, Mn is preferable.

Although a crystal particle size of the dielectric particle included in the dielectric ceramic composition according to the present embodiment is not particularly limited, in order to respond to the demand for making the dielectric layer thinner, it is preferably 0.15 to 0.30 μm. Also, the dielectric ceramic composition according to the present embodiment may further include other components depending on desired characteristics.

A thickness of the dielectric layer 2 is preferably 5.0 μm or below per layer.

Although the number of stacked layers of the dielectric layer 2 is not particularly limited, it is preferably 20 or more, more preferably 50 or more, particularly preferably 100 or more. Although not particularly limited, an upper limit of the number of stacked layers is for example, 2000 and so on.

(Internal Electrode Layer 3)

Although a conductive material included in the internal electrode layer 3 is not particularly limited, comparatively inexpensive base metal may be used, because the material constituting the dielectric layer 2 has resistance to reduction. As for the base metal of the conductive material, Ni or Ni alloy is preferable. As for the Ni alloy, an alloy of at least one kind of elements selected from Mn, Cr, Co and Al with Ni, and Ni content amount in the alloy is preferably 95 wt % or more. Note that, in the Ni or Ni alloy, 0.1 wt % or below or so of various miner component such as P and the like may be included. Although a thickness of the internal electrode layer 3 may be suitably decided depending on a purpose of use and the like, it is normally preferably 0.1 to 3 μm, particularly preferably 0.2 to 2.0 μm and so on.

(External Electrode 4)

Although a conductive material included in an external electrode 4 is not particularly limited, in the present embodiment, inexpensive Ni, Cu and their alloys may be used. A thickness of the external electrode may be suitably decided depending on a purpose of use and the like, and normally 10 to 50 μm and so on is preferable.

(Producing Method for Multilayer Ceramic Capacitor 1)

A multilayer ceramic capacitor 1 of the present embodiment is produced by, as similar with a conventional multilayer ceramic capacitor, producing a green chip by a normal printing method or sheet method using a paste, then firing thereof, and firing after printing or transferring an external electrode. Below, a method for producing will be explained specifically.

Firstly, dielectric material (dielectric ceramic composition powder) is prepared, and made into paste to prepare a paste for forming the dielectric layer (dielectric layer paste).

As for the dielectric material, firstly, a material of $ABO_3$ and a material of the oxide of R are prepared. As for these materials, the above mentioned main component and oxide other than the main component, mixtures thereof or composite oxide can be used. Also, various compounds which become the abovementioned oxide or composite oxide by firing, for example, such as carbonate, oxalate, nitrate, hydroxide or organic metal compounds, and mixtures of thereof may be suitably selected and used.

The material of the $ABO_3$ used may be produced by various methods such as various liquid phase methods (for example, oxalate method, hydrothermal synthesis method, alkoxide method, sol-gel method and the like) as well as so-called solid phase method.

A content of the each compound in the dielectric material may be decided so as to be composition of the above mentioned dielectric ceramic composition after firing. Particle size of the dielectric material is, normally, 0.1 to 1 μm or so on average before the material is made into paste.

The dielectric layer paste may be an organic type paste obtained by kneading the dielectric material and an organic vehicle, or a water-based paste.

The organic vehicle is obtained by dissolving a binder in an organic solvent. The binder used for the organic vehicle is not particularly limited, and may be suitably selected from various normal binders such as ethyl cellulose, polyvinyl butyral and the like. Also, the organic solvent is not particularly limited, and may be suitably selected from various solvents such as terpineol, butyl carbitol, acetone, toluene and the like depending on the method such as printing method or sheet method.

Also, when preparing the dielectric layer paste as water-based paste, a water-based vehicle obtained by dissolving a water soluble binder, dispersion agent and the like in water, and the dielectric material may be kneaded. The water-soluble binder used for the water-based vehicle is not particularly limited, and for example, polyvinyl alcohol, cellulose, water-soluble acrylic resin and the like can be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle. Also, the internal electrode layer may include inhibitor. As for the inhibitor, although not particularly limited, it is preferable that it has a similar composition as the main component.

The external electrode paste can be prepared as similar with the above mentioned internal electrode layer paste.

A content amount of the organic vehicle in the each of the above mentioned paste is not particularly limited, and may be normal content amount, and for example, it may be 1 to 5 wt % or so of the binder, 10 to 50 wt % or so of the solvent. Also, in the each paste, additives selected from various dispersant agent, plasticizer, dielectric material, insulation material and the like may be included if needed. A total amount thereof is preferably 10 wt % or less.

When using the printing method, the dielectric layer paste and the internal electrode layer paste are printed on a substrate such as PET and the like and stacking them, and cutting the stack to a predetermined shape, and after that, a green chip is obtained by removing from the substrate.

When using the sheet method, a green sheet is formed by using the dielectric layer paste, after printing the internal electrode layer paste thereon so as to form an internal electrode pattern, and then, they are stacked so as to obtain a green chip.

Binder removal treatment is performed to the green chip, before firing. As for the binder removal conditions, a temperature rising rate is preferably 5 to 300° C./hr, a holding temperature is preferably 180 to 400° C. and a temperature holding time is preferably 0.5 to 24 hrs. Also, binder removal atmosphere is air or reduced atmosphere.

After the binder removal treatment, the green chip is fired. A temperature rising rate is preferably 100 to 500° C./hr. A holding temperature is preferably 1300° C. or less, more preferably 1150 to 1280° C., and a holding time is preferably 0.5 to 8 hrs, more preferably 2 to 3 hrs. If the holding temperature is below said range, the densification becomes insufficient; and if it exceeds said range, the breakage of the electrode due to the abnormal sintering of the internal electrode layer, the deterioration of the capacitance temperature characteristic due to the dispersion of the constitutional material of the internal electrode layer, or a reduction of the dielectric ceramic composition tend to occur.

Firing atmosphere is preferably reducing atmosphere, as for an atmosphere gas, for example, a wet mixture gas of $N_2$ and $H_2$ may be preferably used.

Also, an oxygen partial pressure when firing may be suitably decided depending on a kind of the conductive material in the internal electrode layer paste. When using base metal such as Ni or Ni alloy and the like, the oxygen partial pressure in the firing atmosphere is preferably $10^{-14}$ to $10^{-10}$ MPa. If the oxygen partial pressure is below said range, the conducting material of the internal electrode layer may have abnormal sintering which results in a breakage thereof. Also, if the oxygen partial pressure exceeds said range, the internal electrode layer tends to oxidize. A temperature descending rate is preferably 50 to 500° C./hr.

It is preferable to perform annealing to a capacitor element body after firing in the reducing atmosphere. The annealing is a treatment for reoxidation of the dielectric layer, and thereby the reliability is improved, because IR lifetime (lifetime of insulation resistance) can be made extremely longer.

An oxygen partial pressure in the anneal atmosphere is preferably $10^{-9}$ to $10^{-5}$ MPa. When the oxygen partial pressure is less than the above range, reoxidation of the dielectric layer is difficult; and when exceeding the above range, oxidation of the internal electrode layer tends to be progressed.

Also, a holding temperature at the time of annealing is preferably 1100° C. or below, particularly preferably 1000 to 1100° C. When the holding temperature is less than the above mentioned range, the dielectric layer may not be sufficiently oxidized. As a result, IR can be easy to lower and IR lifetime can easily be shortened. On the other hand, when the holding temperature exceeds the above mentioned range, not only reduction of a capacitance due to oxidization of the internal electrode layer, but also deterioration of the capacitance temperature characteristic, decrease in IR and reduction of IR lifetime can easily occur. Note that, the annealing can only be constituted by the temperature rising process and temperature descending process. Namely, the temperature holding time may be 0. In this case, the holding time is same as a maximum temperature.

As for other annealing conditions, a temperature holding time is preferably 0 to 20 hrs, more preferably 2 to 4 hrs, and a temperature descending rate is preferably 50 to 500° C./hr, more preferably 100 to 300° C./hr. Also, as for an atmosphere gas of the annealing, for example, it is preferable to use wet $N_2$ gas and the like.

In the above mentioned binder removal treatment, firing and annealing, in order to wet the $N_2$ gas and mixture gas and the like, for example, a wetter and the like may be used. In this case, a water temperature is preferably 5 to 75° C. or so.

The binder removal treatment, firing and annealing may be performed continuously or individually.

An end face polishing is conducted to a capacitor element body obtained as above, for example, by barrel polishing or sandblast, and then, an external electrode paste is printed to bake, so that an external electrode 4 is formed. Then a covering layer is formed on a surface of the external electrode 4 by plating and the like if needed.

Thus produced multilayer ceramic capacitor of the present embodiment is used for various electronic components and the like by mounting the same on a print circuit board and the like with soldering and the like.

The foregoing has been described with respect to an embodiment of the present invention, however, the present invention is not limited to the above mentioned embodiment at all, and various modifications can be made within a scope of the present invention.

For example, in the above embodiment, a multilayer ceramic capacitor is explained as an example of a ceramic electronic component according to the present invention. However, such ceramic electronic component is not limited to a multilayer ceramic capacitor and may be any as far as it includes the above composition.

EXAMPLES

Below, the present invention will be explained based on further detailed examples, however, the present invention is not limited to these examples.

Example 1

First, $BaTiO_3$ powder as material of $ABO_3$, $Dy_2O_3$ powder as material of oxide of RA, $Ho_2O_3$ powder as material of oxide of RB and $Yb_2O_3$ powder as material of oxide of RC were prepared. Also, $MgCO_3$ powder as material of oxide of Mg, MnO powder as material of oxide of Mn, $V_2O_5$ powder as material of oxide of V and $SiO_2$ powder as a sintering agent were prepared.

Next, respective powder materials prepared in the above procedure were weighed so as to have the amounts shown in Table 1, and then mixed and pulverized by a ball mill for 10 hours followed by drying to obtain a dielectric material. Note that for samples 7 and 8, $Tb_4O_7$ powder (sample 7) and $Gd_2O_3$ powder (sample 8) as material of oxide of RA were prepared. For sample 12, $Y_2O_3$ powder as material of oxide of RB was prepared. For sample 16, $Lu_2O_3$ powder as material of oxide of RC was prepared. Also, $MgCO_3$ will be included as MgO in dielectric ceramic composition after firing.

Next, 100 parts by weight of the obtained dielectric material, 10 parts by weight of polyvinyl butyral resin, 5 parts by weight of dioctylphthalate (DOP) as a plasticizer and 100 parts by weight of alcohol as solvent were mixed by a ball-mill and made into a paste, so that a dielectric layer paste was obtained.

Also, 44.6 parts by weight of Ni particle, 52 parts by weight of terpineol, 3 parts by weight of ethylcellulose, 0.4 part by weight of benzotriazole were kneaded by triple roll mill and made into a paste, so that an internal electrode layer paste was obtained.

Then, a green sheet was formed on a PET film by using the dielectric layer paste prepared in the above procedure so that thickness of the green sheet was 4.5 μm after drying. Next, after an electrode layer was printed thereon with a predetermined pattern by using the internal electrode layer paste, a sheet was removed from the PET film, so that a green sheet having the electrode layer was made. Next, a plurality of green sheets having the electrode layer were stacked and adhered by pressure to form a green stacking body. The green stacking body was cut in a predetermined size to obtain a green chip.

Next, the obtained green chip was subject to binder removal treatment, firing and annealing under following conditions, so that a multilayer ceramic firing body was obtained.

The binder removal treatment was performed under a condition of a temperature rising rate: 25° C./hr, a holding temperature: 260° C., a holding time: 8 hrs and atmosphere: in the air.

The firing was performed under a condition of a temperature rising rate: 200° C./hr, a holding temperature: 1240° C., a holding time: 2 hrs and a temperature descending rate: 200° C./hr. Note that, an atmosphere gas was wet $N_2+H_2$ mixture gas so that an oxygen partial pressure was adjusted to $10^{-12}$ MPa.

The annealing was performed under a condition of a temperature rising rate: 200° C./hr, a holding temperature: 1000° C., a holding time: 2 hrs, a temperature descending rate: 200° C./hr and atmosphere gas: wet $N_2$ gas (oxygen partial pressure $10^{-7}$ MPa).

Note that, a wetter was used for wetting the atmosphere gas at the firing and annealing.

Next, after polishing an end face of the obtained multilayer ceramic firing body by sandblast, Cu was coated as an external electrode so that a multilayer ceramic capacitor sample shown in FIG. 1 was obtained. A size of the obtained capacitor sample was 3.2 mm×1.6 mm×0.6 mm, a thickness of the dielectric layer was 3.0 μm, a thickness of the internal electrode layer was 1.1 μm, and a number of the dielectric layer sandwiched by the internal electrode layer was set to 4.

For the obtained each capacitor sample, a specific permittivity, a CR product, a capacitance temperature characteristic and a high temperature accelerated lifetime (HALT) were measured by the methods shown below.

(Specific Permittivity $\in$)

The specific permittivity $\in$ was calculated from a capacitance of the obtained capacitor sample measured at a reference temperature of 25° C. with a digital LCR meter (4274A made by YHP) under a condition of a frequency of 1 kHz and an input signal level (measurement voltage) of 1.0 Vrms. Higher specific permittivity is preferable, and in the present example, samples in which specific permittivity was 1500 or higher were determined as good. The results are shown in Table 1.

(CR Product)

On each capacitor sample, insulation resistance IR was measured after applying a direct-current voltage of 10 V/μm at 20° C. for 1 minute by using an insulation resistance tester (R8340A made by Advantest Corporation). A CR product was measured by obtaining a product of capacitance C (unit: μF) measured as explained above and insulation resistance IR (unit: MΩ). In the present examples, the samples in which the CR product was 500 or higher were determined as good. The results are shown in Table 1.

(Capacitance Temperature Characteristic)

To the capacitor samples, a capacitance from −55 to 125° C. was measured so as to calculate a change rate ΔC of the capacitance, and it was evaluated whether the change rate satisfied the X7R characteristic of EIA standard or not. Namely, it was evaluated whether the change rate ΔC through the above temperature range was within ±15% or not. The results are shown in Table 1.

(High Temperature Accelerated Lifetime)

To the capacitor samples, the lifetime was measured while applying the direct voltage under the electric field of 48 V/μm at 195° C., and thereby the high temperature load lifetime was evaluated. In the present example, the lifetime was defined as the time from the beginning of the voltage application until the insulation resistance dropped by one digit. Also this high temperature accelerated lifetime evaluation was performed to 20 capacitor samples so that an average value was defined as the high temperature accelerated lifetime. In the present example, sample in which the lifetime was 3 hours or longer was determined as good. The results are shown in Table 1.

Also, in the Table 1, the samples whose firing temperature was 1300° C. or less were expressed as "good", and the samples whose firing temperature was more than 1300° C. were expressed as "bad".

TABLE 1

| Sample No. | BaTiO$_3$ [mol] | MgO in terms of Mg α [mol] | RA$_2$O$_3$ α [mol] | RB$_2$O$_3$ β [mol] | RC$_2$O$_3$ γ [mol] | SiO$_2$ in terms of Si [mol] | V$_2$O$_5$ in terms of V [mol] | MnO in terms of Mn [mol] | α/β | β/γ | Specific permittivity | CR product [μF-MΩ] | Temperature change rate of capacitance [%] | HALT [h] | Firing temperature |
|---|---|---|---|---|---|---|---|---|---|---|---|---|---|---|---|
| 1 | 100 | 0.80 | 1.20 | 0.40 | 0.40 | 1.60 | 0.03 | 0.16 | 3.00 | 1.00 | 2300 | 2613 | −12.2 | 6.5 | good |
| 2 | 100 | 1.30 | 1.20 | 0.40 | 0.40 | 1.60 | 0.03 | 0.16 | 3.00 | 1.00 | 1927 | 2901 | −8.1 | 8.2 | good |
| 3 | 100 | 2.00 | 1.20 | 0.40 | 0.40 | 1.60 | 0.03 | 0.16 | 3.00 | 1.00 | 1706 | 3491 | −10.2 | 7.0 | good |
| 4 | 100 | 1.00 | 1.00 | 0.25 | 0.25 | 1.80 | 0.09 | 0.12 | 4.00 | 1.00 | 2214 | 1345 | −6.5 | 6.2 | good |
| 5 | 100 | 1.00 | 1.70 | 0.40 | 0.30 | 1.80 | 0.09 | 0.12 | 4.25 | 1.33 | 1980 | 1465 | −9.3 | 9.5 | good |
| 6 | 100 | 1.00 | 2.50 | 0.60 | 0.10 | 1.80 | 0.09 | 0.12 | 4.17 | 6.00 | 1726 | 1521 | −12.4 | 9.1 | good |
| 7 | 100 | 1.00 | 1.70 | 0.40 | 0.30 | 1.80 | 0.09 | 0.12 | 4.25 | 1.33 | 1856 | 1421 | −11.1 | 9.1 | good |
| 8 | 100 | 1.00 | 1.70 (Tb) | 0.40 | 0.30 | 1.80 | 0.09 | 0.12 | 4.25 | 1.33 | 1732 | 1476 | −11.7 | 8.1 | good |
| 9 | 100 | 1.50 | 1.00 (Gd) | 0.20 | 0.12 | 2.60 | 0.06 | 0.13 | 5.00 | 1.67 | 2358 | 2345 | −7.1 | 8.1 | good |
| 10 | 100 | 1.50 | 1.90 | 0.60 | 0.60 | 2.60 | 0.06 | 0.13 | 3.17 | 1.00 | 2134 | 2109 | −8.5 | 10.6 | good |
| 11 | 100 | 1.50 | 2.50 | 1.00 | 0.50 | 2.60 | 0.06 | 0.13 | 2.50 | 2.00 | 1825 | 2054 | −9.8 | 5.1 | good |
| 12 | 100 | 1.50 | 1.90 (Y) | 0.60 | 0.60 | 2.60 | 0.06 | 0.13 | 3.17 | 1.00 | 2186 | 2142 | −8.7 | 7.6 | good |
| 13 | 100 | 1.80 | 2.50 | 1.00 | 0.10 | 2.80 | 0.05 | 0.10 | 2.50 | 10.00 | 1987 | 2065 | −10.5 | 9.6 | good |
| 14 | 100 | 1.80 | 2.30 | 0.80 | 0.60 | 2.80 | 0.05 | 0.10 | 2.88 | 1.33 | 1874 | 1981 | −7.3 | 8.2 | good |
| 15 | 100 | 1.80 | 2.50 | 1.00 | 1.00 | 2.80 | 0.05 | 0.10 | 2.50 | 1.00 | 1654 | 1893 | −5.4 | 6.1 | good |
| 16 | 100 | 1.80 | 2.30 (Lu) | 0.80 | 0.60 | 2.80 | 0.05 | 0.10 | 2.88 | 1.33 | 1855 | 1962 | −6.9 | 6.1 | good |
| 17a | 100 | 1.70 | 2.30 | 0.90 | 0.90 | 1.20 | 0.10 | 0.18 | 2.56 | 1.00 | 1950 | 1408 | −9.5 | 7.5 | good |
| 17 | 100 | 1.70 | 2.30 | 0.90 | 0.90 | 1.50 | 0.10 | 0.18 | 2.56 | 1.00 | 1965 | 1344 | −10.1 | 7.9 | good |
| 18 | 100 | 1.70 | 2.30 | 0.90 | 0.90 | 1.90 | 0.10 | 0.18 | 2.56 | 1.00 | 1807 | 1206 | −12.2 | 8.5 | good |
| 19 | 100 | 1.70 | 2.30 | 0.90 | 0.90 | 3.00 | 0.10 | 0.18 | 2.56 | 1.00 | 2489 | 1108 | −12.9 | 3.7 | good |

From the Table 1, when the contents and ratios of the Mg oxide, the RA oxide, the RB oxide, the RC oxide and the Si oxide were within the range of the present invention, it was confirmed that the dielectric ceramic composition which showed high temperature accelerated lifetime with satisfying X7R characteristic and furthermore showed high specific permittivity was obtained. Also, when using other elements except for Dy, Ho and Yb as RA, RB and RC, respectively, it was confirmed that similar effect was obtained.

Example 2

Except that contents of the respective components were set as the amounts shown in Table 2, multilayer ceramic capacitor samples were made as similar with the example 1 and characteristic evaluations as similar with the example 1 were performed. The results are shown in Table 2. Note that, for sample 47, $Tb_4O_7$ powder as material of oxide of RA and $Y_2O_3$ powder as material of oxide of RB were prepared. For sample 48, $Y_2O_3$ powder as material of oxide of RB was prepared.

TABLE 2

| Sample No. | BaTiO$_3$ [mol] | MgO in terms of Mg [mol] | RA$_2$O$_3$ α [mol] | RB$_2$O$_3$ β [mol] | RC$_2$O$_3$ γ [mol] | SiO$_2$ in terms of Si [mol] | V$_2$O$_5$ in terms of V [mol] | MnO in terms of Mn [mol] | α/β | β/γ | Specific permittivity | CR product [μF-MΩ] | Temperature change rate of capacitance [%] | HALT [h] | Firing temperature |
|---|---|---|---|---|---|---|---|---|---|---|---|---|---|---|---|
| *31 | 100 | 0.50 | 1.20 | 0.40 | 0.40 | 1.60 | 0.03 | 0.16 | 3.00 | 1.00 | 2600 | 2276 | −17.8 | 4.2 | good |
| *32 | 100 | 3.00 | 1.20 | 0.40 | 0.40 | 1.60 | 0.03 | 0.16 | 3.00 | 1.00 | 1400 | 3521 | −14.6 | 1.8 | good |
| *33 | 100 | 1.00 | 0.50 | 0.25 | 0.25 | 1.80 | 0.09 | 0.12 | 2.00 | 1.00 | 2478 | 1292 | −5.2 | 0.3 | good |
| *33a | 100 | 1.20 | 3.00 | 0.80 | 0.20 | 2.40 | 0.04 | 0.10 | 3.75 | 4.00 | 1860 | 1472 | −17.5 | 5.1 | good |
| *34 | 100 | 1.00 | 4.00 | 0.40 | 0.30 | 1.80 | 0.09 | 0.12 | 10.0 | 1.33 | 1325 | 1623 | −18.1 | 5.1 | good |
| *35 | 100 | 1.50 | 1.00 | 0.01 | 0.10 | 2.60 | 0.06 | 0.13 | 100.0 | 0.10 | 2367 | 2391 | −15.8 | 3.2 | good |
| *36 | 100 | 1.50 | 2.50 | 3.00 | 0.50 | 2.60 | 0.06 | 0.13 | 0.83 | 6.00 | 1389 | 1891 | −9.8 | 2.3 | good |
| *37 | 100 | 1.80 | 2.50 | 1.00 | 0.01 | 2.80 | 0.05 | 0.10 | 2.50 | 100.0 | 1998 | 2145 | −20.1 | 9.1 | good |
| *38 | 100 | 1.80 | 2.30 | 0.80 | 3.00 | 2.80 | 0.05 | 0.10 | 2.88 | 0.27 | 1264 | 1567 | −4.3 | 1.6 | good |
| *39 | 1.00 | 1.70 | 2.30 | 0.90 | 0.90 | 1.00 | 0.10 | 0.18 | 2.56 | 1.00 | 1875 | 1567 | −15.9 | 6.5 | bad |
| *40 | 100 | 1.70 | 2.30 | 0.90 | 0.90 | 4.00 | 0.10 | 0.18 | 2.56 | 1.00 | 2856 | 1091 | −14.1 | 0.6 | good |
| *40a | 100 | 1.40 | 2.50 | 0.20 | 0.20 | 1.80 | 0.05 | 0.15 | 12.50 | 1.00 | 2010 | 1355 | −16.9 | 4.8 | good |
| *41 | 100 | 1.30 | 1.00 | — | — | 1.60 | 0.03 | 0.16 | — | — | 2198 | 2789 | −20.4 | 4.1 | good |
| *42 | 100 | 1.30 | — | 1.00 | — | 1.60 | 0.03 | 0.16 | 0 | — | 2256 | 2891 | −17.8 | 2.3 | good |
| *43 | 100 | 1.30 | — | — | 1.00 | 1.60 | 0.03 | 0.16 | — | 0 | 2478 | 3091 | −3.2 | 0.01 | good |
| *44 | 100 | 1.00 | 1.00 | 0.50 | — | 2.00 | 0.05 | 0.14 | 2.00 | — | 1981 | 2345 | −16.5 | 5.2 | good |
| *45 | 100 | 1.00 | 1.00 | — | 0.50 | 2.00 | 0.05 | 0.14 | — | 0 | 2128 | 2291 | −7.1 | 1.6 | good |
| *46 | 100 | 1.00 | — | 1.00 | 0.50 | 2.00 | 0.05 | 0.14 | 0 | 2.00 | 2261 | 2451 | −5.5 | 0.34 | good |
| *47 | 100 | 1.40 | 2.40 (Tb) | 0.90 (Y) | — | 2.55 | 0.06 | 0.17 | 2.67 | — | 1781 | 2387 | −22.2 | 5.1 | good |
| *48 | 100 | 2.00 | — | 1.00 (Y) | 4.00 | 3.00 | 0.01 | 0.38 | 0 | 0.25 | 1964 | 3906 | −2.1 | 0.01 | good |

Samples with "*" mark are comparative examples of the present invention

From the Table 2, when the contents and ratios of the Mg oxide, the RA oxide, the RB oxide, the RC oxide and the Si oxide were without the range of the present invention (samples No. 31 to 40a), it was confirmed that at least any one of the specific permittivity, X7R characteristic and high temperature accelerated lifetime were deteriorated. Also, when only one kind or two kinds of rare earth elements (RA, RB and RC) were included (samples No. 41 to 48), it was confirmed that X7R characteristic and high temperature accelerated lifetime failed to be compatible.

Example 3

Except for changing contents of the oxide of V and the oxide of Mn, multilayer ceramic capacitor samples were made as similar with the example 1 and characteristic evaluations as similar with the example 1 were performed. The results are shown in Table 3.

TABLE 3

| Sample No. | BaTiO$_3$ [mol] | MgO in terms of Mg [mol] | RA$_2$O$_3$ α [mol] | RB$_2$O$_3$ β [mol] | RC$_2$O$_3$ γ [mol] | SiO$_2$ in terms of Si [mol] | V$_2$O$_5$ in terms of V [mol] | MnO in terms of Mn [mol] | α/β | β/γ | Specific permittivity | [μF-MΩ] | Temperature change rate of capacitance [%] | HALT [h] | Firing temperature |
|---|---|---|---|---|---|---|---|---|---|---|---|---|---|---|---|
| **61 | 100 | 2.00 | 2.00 | 0.70 | 0.70 | 1.50 | 0.01 | 0.20 | 2.86 | 1.00 | 2136 | 4567 | −8.2 | 2.0 | good |
| 62 | 100 | 2.00 | 2.00 | 0.70 | 0.70 | 1.50 | 0.03 | 0.20 | 2.86 | 1.00 | 2114 | 3456 | −8.7 | 3.6 | good |
| 63 | 100 | 2.00 | 2.00 | 0.70 | 0.70 | 1.50 | 0.07 | 0.20 | 2.86 | 1.00 | 2035 | 2679 | −7.8 | 6.4 | good |

TABLE 3-continued

| Sample No. | BaTiO$_3$ [mol] | MgO in terms of Mg [mol] | RA$_2$O$_3$ α [mol] | RB$_2$O$_3$ β [mol] | RC$_2$O$_3$ γ [mol] | SiO$_2$ in terms of Si [mol] | V$_2$O$_5$ in terms of V [mol] | MnO in terms of Mn [mol] | α/β | β/γ | Specific permittivity | [μF-MΩ] | Temperature change rate of capacitance [%] | HALT [h] | Firing temperature |
|---|---|---|---|---|---|---|---|---|---|---|---|---|---|---|---|
| 64 | 100 | 2.00 | 2.00 | 0.70 | 0.70 | 1.50 | 0.12 | 0.20 | 2.86 | 1.00 | 2011 | 781 | −7.5 | 10.5 | good |
| **65 | 100 | 2.00 | 2.00 | 0.70 | 0.70 | 1.50 | 0.15 | 0.20 | 2.86 | 1.00 | 1989 | 340 | −8.0 | 8.9 | good |
| **66 | 100 | 0.70 | 1.60 | 0.50 | 0.50 | 2.10 | 0.07 | 0.05 | 3.20 | 1.00 | 2258 | 451 | −9.2 | 3.1 | good |
| 67 | 100 | 0.70 | 1.60 | 0.50 | 0.50 | 2.10 | 0.07 | 0.10 | 3.20 | 1.00 | 2108 | 782 | −9.7 | 7.4 | good |
| 68 | 100 | 0.70 | 1.60 | 0.50 | 0.50 | 2.10 | 0.07 | 0.15 | 3.20 | 1.00 | 1980 | 1465 | −8.9 | 7.2 | good |
| 69 | 100 | 0.70 | 1.60 | 0.50 | 0.50 | 2.10 | 0.07 | 0.20 | 3.20 | 1.00 | 1945 | 1976 | −12.1 | 7.5 | good |
| **70 | 100 | 0.70 | 1.60 | 0.50 | 0.50 | 2.10 | 0.07 | 0.30 | 3.20 | 1.00 | 1745 | 1997 | −15.2 | 3.2 | good |

Samples with "**" mark are reference examples of the present invention

From the Table 3, when the contents of the oxide of V and the oxide of Mn were without preferable ranges of the present invention (samples No. 61, 65, 66 and 70), it was confirmed that any one of the CR product, X7R characteristic and high temperature accelerated lifetime were deteriorated.

Example 4

Except that thicknesses of the dielectric layer (interlayer thickness) of samples 2, 47 and 48 were set as the values shown in Table 4, multilayer ceramic capacitor samples were made as similar with the example 1 and characteristic evaluations as similar with the example 1 were performed. The results are shown in Table 4.

TABLE 4

| Sample No. | Thickness of the dielectric layer [μM] | Specific permittivity | CR product [μF-MΩ] | Temperature change rate of capacitance [%] | HALT [h] | Firing temperature |
|---|---|---|---|---|---|---|
| 2a | 1.0 | 2011 | 2635 | −13.3 | 3.1 | good |
| 2b | 1.5 | 1954 | 2827 | −12.1 | 4.5 | good |
| 2 | 3.0 | 1927 | 2901 | −8.1 | 8.2 | good |
| 2c | 4.0 | 1921 | 3011 | −7.2 | 15.1 | good |
| 2d | 5.0 | 1919 | 3054 | −6.8 | 26.1 | good |
| *47a | 1.0 | 1897 | 2109 | −29.1 | 2.0 | good |
| *47b | 1.5 | 1823 | 2232 | −27.4 | 2.8 | good |
| *47 | 3.0 | 1781 | 2387 | −22.2 | 5.1 | good |
| *47c | 4.0 | 1771 | 2456 | −19.2 | 9.6 | good |
| *47d | 5.0 | 1773 | 2498 | −17.4 | 17.2 | good |
| *48a | 1.0 | 2015 | 3345 | −7.2 | 0.01> | good |
| *48b | 1.5 | 1981 | 3621 | −4.4 | 0.01> | good |
| *48 | 3.0 | 1964 | 3906 | −2.1 | 0.01 | good |
| *48c | 4.0 | 1951 | 4100 | −2.2 | 0.02 | good |
| *48d | 5.0 | 1948 | 4151 | −2.0 | 0.03 | good |

Samples with "*" mark are comparative examples of the present invention

From the Table 4, even when the thickness of the dielectric layer of sample 2 was made thinner, it was confirmed that good high temperature accelerated lifetime was obtained, and in addition, high specific permittivity was obtained with satisfying X7R characteristic.

On the other hand, when the thickness of the dielectric layer of sample 47 was made thinner, it was confirmed that the sample failed to satisfy X7R characteristic, and in addition, showed that high temperature accelerated lifetime tended to be deteriorated. Also, when the thickness of the dielectric layer of sample 48 was made thinner, it was confirmed that high temperature accelerated lifetime was extremely deteriorated while the sample satisfied X7R characteristic.

The invention claimed is:

1. A dielectric ceramic composition comprising:
    a compound having perovskite type crystal structure shown by a general formula ABO$_3$, where A is at least one selected from the group consisting of Ba, Ca and Sr, and B is at least one selected from the group consisting of Ti and Zr, as a main component;
    as subcomponents, with respect to 100 moles of said compound,
        1.0 to 2.5 moles of an oxide of RA in terms of RA$_2$O$_3$, where RA is at least one selected from the group consisting of Dy, Gd and Tb;
        0.2 to 1.0 mole of an oxide of RB in terms of RB$_2$O$_3$, where RB is at least one selected from the group consisting of Ho and Y;
        0.1 to 1.0 mole of an oxide of RC in terms of RC$_2$O$_3$, where RC is at least one selected from the group consisting of Yb and Lu;
        0.8 to 2.0 moles of an oxide of Mg in terms of Mg; and
        1.2 to 3.0 moles of an oxide including Si in terms of Si,
    wherein when contents of said oxide of RA, said oxide of RB and said oxide of RC with respect to 100 moles of said compound are defined as "α", "β" and "γ", respectively, said "α", "β" and "γ" satisfy relations of $2.5 \leq (\alpha/\beta) \leq 5.0$ and $1.0 \leq (\beta/\gamma) \leq 10.0$.

2. The dielectric ceramic composition as set forth in claim 1 further comprising, as a subcomponent, 0.03 to 0.12 mole of an oxide of at least one selected from the group consisting of V, Mo and W in terms of V, Mo and W.

3. The dielectric ceramic composition as set forth in claim 1 further comprising, as a subcomponent, 0.10 to 0.2 mole of an oxide of Mn and/or Cr in terms of Mn and Cr.

4. The dielectric ceramic composition as set forth in claim 2 further comprising, as a subcomponent, 0.10 to 0.2 mole of an oxide of Mn and/or Cr in terms of Mn and Cr.

5. The dielectric ceramic composition as set forth in claim 1, wherein said ABO$_3$ is BaTiO$_3$.

6. The dielectric ceramic composition as set forth in claim 2, wherein said ABO$_3$ is BaTiO$_3$.

7. The dielectric ceramic composition as set forth in claim 3, wherein said ABO$_3$ is BaTiO$_3$.

8. The dielectric ceramic composition as set forth in claim 4, wherein said ABO$_3$ is BaTiO$_3$.

9. A ceramic electronic component comprising a dielectric layer composed of said dielectric ceramic composition as set forth in claim 1 and an electrode, wherein a thickness of said dielectric layer is 5.0 μm or less.

10. The ceramic electronic component as set forth in claim 9, wherein said dielectric ceramic composition further comprises, as subcomponents, 0.03 to 0.12 mole of an oxide of at least one selected from the group consisting of V, Mo and W in terms of V, Mo and W, and 0.10 to 0.2 mole of an oxide of Mn and/or Cr in terms of Mn and Cr.

\* \* \* \* \*